US008837856B2

(12) United States Patent
Fukunaga

(10) Patent No.: US 8,837,856 B2
(45) Date of Patent: Sep. 16, 2014

(54) IMAGE PROCESSING APPARATUS, IMAGE PROCESSING METHOD, AND COMPUTER READABLE MEDIUM

(75) Inventor: Masakazu Fukunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/295,745

(22) Filed: Nov. 14, 2011

(65) Prior Publication Data
US 2012/0301033 A1 Nov. 29, 2012

(30) Foreign Application Priority Data

May 23, 2011 (JP) ................................. 2011-115011

(51) Int. Cl.
G06K 9/40 (2006.01)
G06K 9/66 (2006.01)
G06T 7/00 (2006.01)
H04N 1/407 (2006.01)
G06T 5/00 (2006.01)
H04N 1/401 (2006.01)
G06K 9/32 (2006.01)

(52) U.S. Cl.
CPC ..... *G06K 9/3258* (2013.01); *G06T 2207/30108* (2013.01); *G06T 7/0081* (2013.01); *H04N 1/4072* (2013.01); *G06T 5/003* (2013.01); *H04N 1/401* (2013.01)
USPC .......................................... 382/274; 382/195

(58) Field of Classification Search
None
See application file for complete search history.

(56) References Cited

U.S. PATENT DOCUMENTS

| 6,201,893 | B1 * | 3/2001 | Shiraiwa et al. | 382/167 |
| 6,535,302 | B1 * | 3/2003 | Ikeda et al. | 358/3.26 |
| 6,694,051 | B1 * | 2/2004 | Yamazoe et al. | 382/167 |
| 6,944,353 | B2 | 9/2005 | Matsuda | |
| 6,982,756 | B2 * | 1/2006 | Nakamura | 348/241 |
| 7,359,566 | B2 * | 4/2008 | Kita | 382/260 |
| 7,912,282 | B2 * | 3/2011 | Nakamura | 382/167 |
| 8,249,303 | B2 * | 8/2012 | Nitanda | 382/104 |
| 8,351,090 | B2 * | 1/2013 | Makino | 358/474 |

(Continued)

FOREIGN PATENT DOCUMENTS

| JP | 2001136438 A | 5/2001 |
| JP | 2002-247363 A | 8/2002 |
| JP | 3426189 B2 | 7/2003 |
| JP | 4111697 B2 | 7/2008 |

OTHER PUBLICATIONS

Australian Patent Examination Report No. 1, dated Jan. 8, 2013, issued in corresponding Australian Patent Application No. 2011254013.

(Continued)

*Primary Examiner* — Stephen R Koziol
*Assistant Examiner* — Sean Conner
(74) *Attorney, Agent, or Firm* — Sughrue Mion, PLLC

(57) ABSTRACT

An image processing apparatus includes the following elements. A receiving device receives an image. An extracting device extracts regions from the image received by the receiving device. A selecting device selects a region from among the regions extracted by the extracting device in accordance with a predetermined rule. A measuring device measures luminance values of pixels contained in the region selected by the selecting device. An estimating device estimates a function representing a degree of fog in the image received by the receiving device from the luminance values of the pixels measured by the measuring device. An eliminating device eliminates fog from the image received by the receiving device on the basis of the function estimated by the estimating device.

15 Claims, 15 Drawing Sheets

(56) References Cited

U.S. PATENT DOCUMENTS

| | | |
|---|---|---|
| 2002/0021839 A1 | 2/2002 | Takahashi |
| 2002/0030837 A1* | 3/2002 | Hokoi ............................ 358/1.9 |
| 2002/0164074 A1* | 11/2002 | Matsugu et al. ............. 382/173 |
| 2003/0016867 A1 | 1/2003 | Matsuda |
| 2003/0235327 A1* | 12/2003 | Srinivasa ...................... 382/104 |
| 2004/0071362 A1* | 4/2004 | Curry et al. ................... 382/274 |
| 2004/0119995 A1* | 6/2004 | Nishi et al. ..................... 358/1.9 |
| 2006/0007511 A1* | 1/2006 | Koyama et al. ............... 358/521 |
| 2007/0248282 A1* | 10/2007 | Suzuki .......................... 382/282 |
| 2008/0002216 A1* | 1/2008 | Matsushima .................. 358/1.9 |
| 2008/0024845 A1 | 1/2008 | Makino et al. |
| 2008/0118172 A1* | 5/2008 | Kim .............................. 382/260 |
| 2009/0002785 A1* | 1/2009 | Marcu et al. .................. 358/525 |
| 2010/0046047 A1* | 2/2010 | Makino ......................... 358/475 |
| 2010/0086217 A1* | 4/2010 | Matsuhira ..................... 382/199 |
| 2010/0278423 A1* | 11/2010 | Itoh et al. ...................... 382/169 |
| 2012/0301033 A1* | 11/2012 | Fukunaga ..................... 382/195 |

OTHER PUBLICATIONS

Notification of Reasons for Refusal, dated Jan. 29, 2013, issued in corresponding Japanese Patent Application No. 2011-115011.

Notification of Reason for Refusal, dated May 7, 2013, issued in corresponding Japanese Patent Application No. 2011-115011.

\* cited by examiner

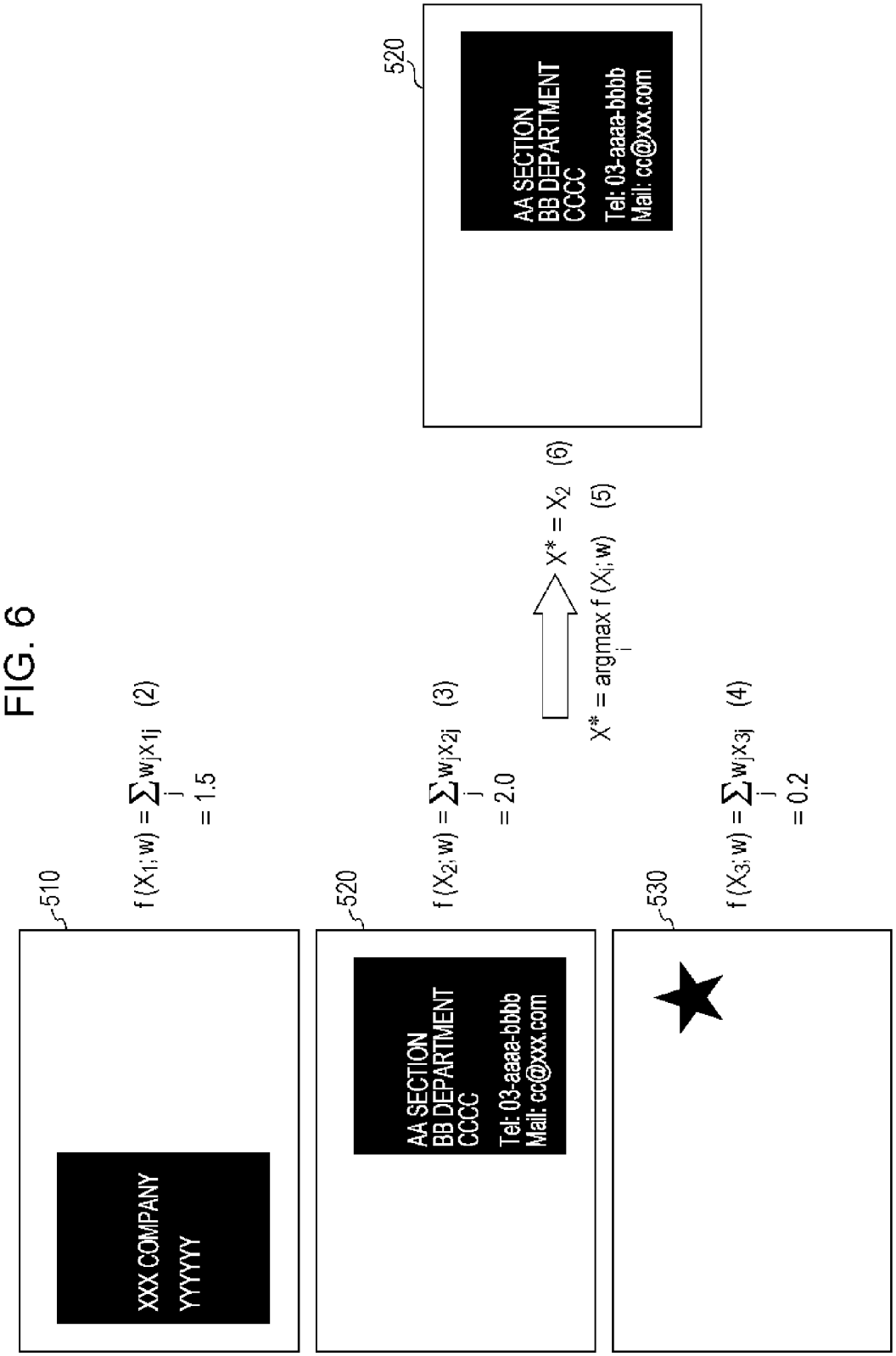

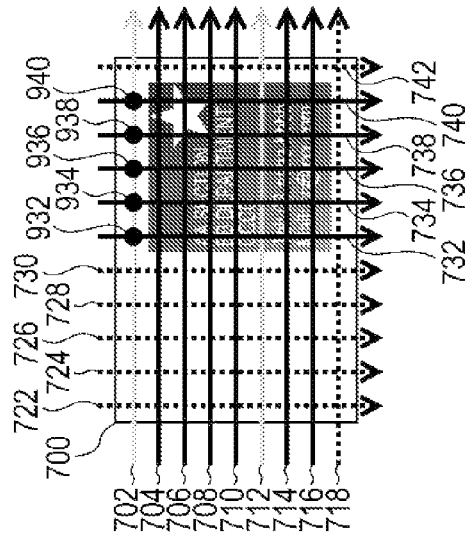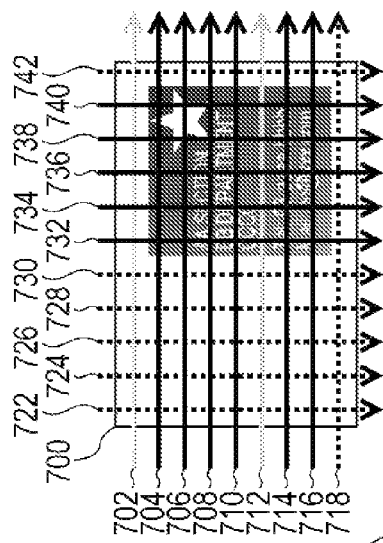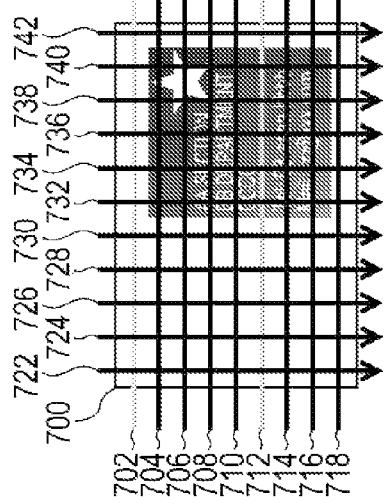

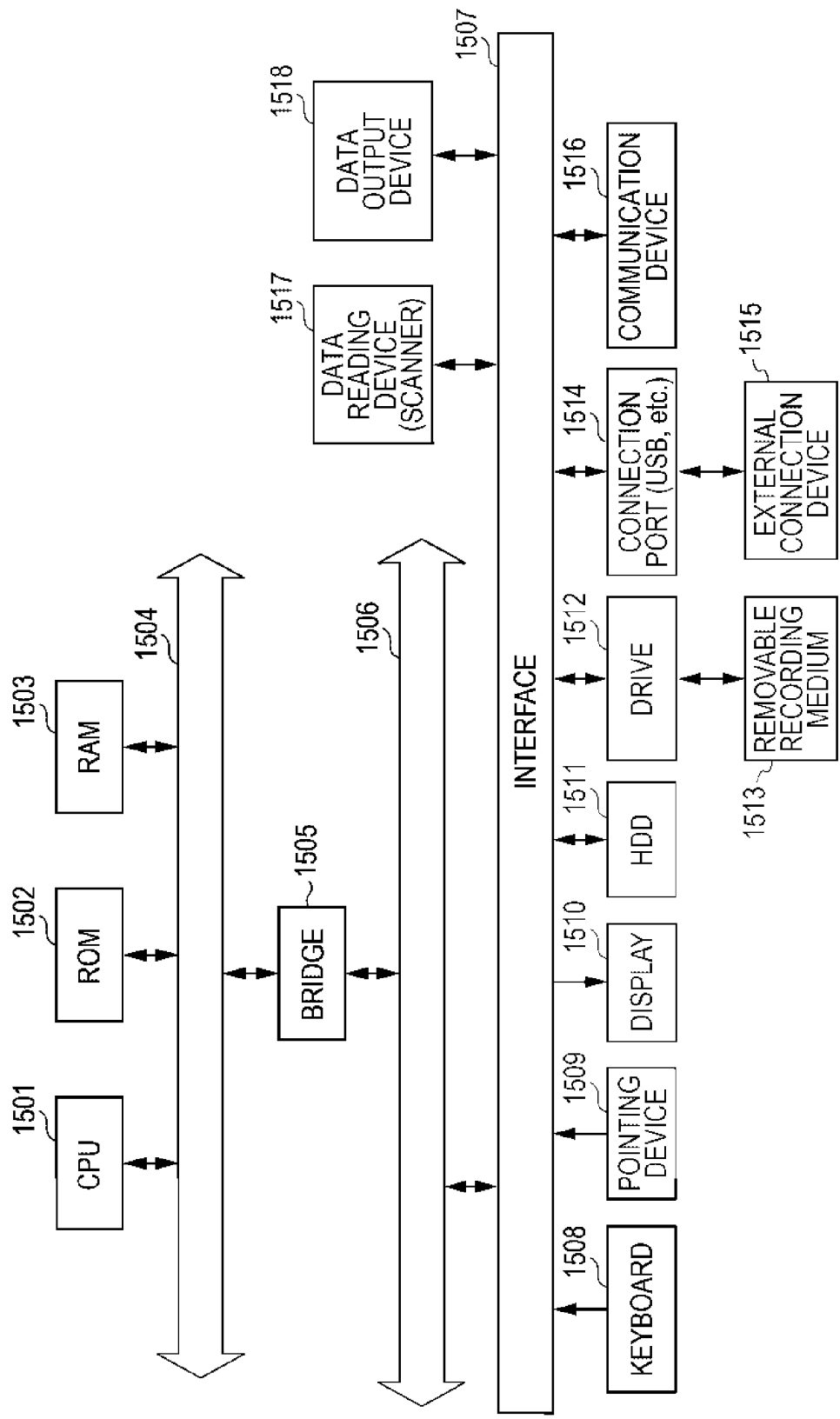

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-115011 filed May 23, 2011.

BACKGROUND

Technical Field

The present invention relates to image processing apparatuses, image processing methods, and computer readable media.

SUMMARY

According to an aspect of the invention, there is provided an image processing apparatus including: a receiving device that receives an image; an extracting device that extracts regions from the image received by the receiving device; a selecting device that selects a region from among the regions extracted by the extracting device in accordance with a predetermined rule; a measuring device that measures luminance values of pixels contained in the region selected by the selecting device; an estimating device that estimates a function representing a degree of fog in the image received by the receiving device from the luminance values of the pixels measured by the measuring device; and an eliminating device that eliminates fog from the image received by the receiving device on the basis of the function estimated by the estimating device.

BRIEF DESCRIPTION OF THE DRAWINGS

Exemplary embodiment(s) of the present invention will be described in detail based on the following figures, wherein:

FIG. 6 illustrates an example of processing performed by an inspection-region selecting module;

FIGS. 9A through 10C illustrate an example of processing performed by a pixel-value distribution estimating module;

FIG. 15 is a block diagram illustrating an example of the hardware configuration of a computer implementing the exemplary embodiment.

DETAILED DESCRIPTION

In order to facilitate the understanding of an exemplary embodiment, a technology, which serves as a basis for the exemplary embodiment, will first be described.

Figure 14A:
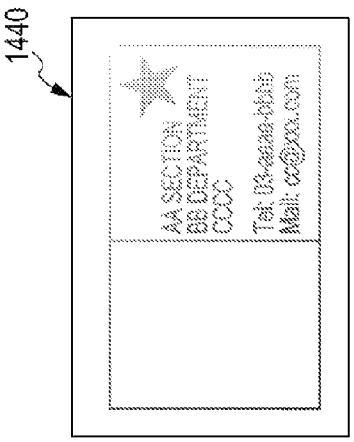
FIGS. 14A through 14F illustrate an example of a technology, which serves as a basis for the exemplary embodiment.
Figure 14C:
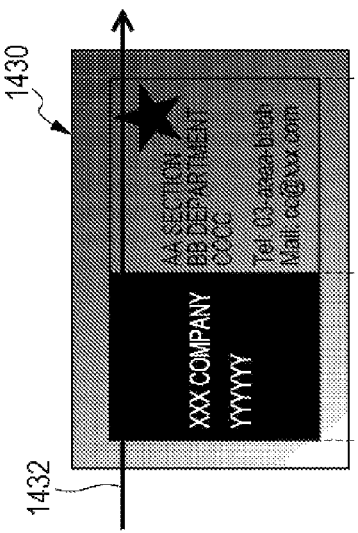
Figure 14E:
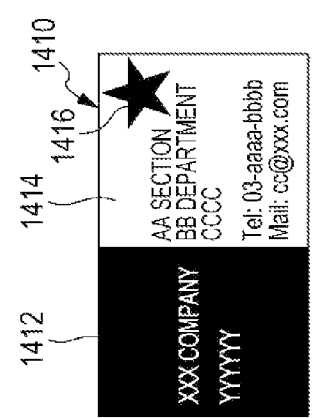
Figure 14B:
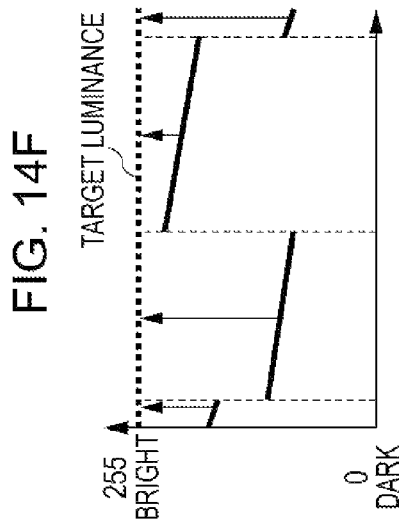
Figure 14D:
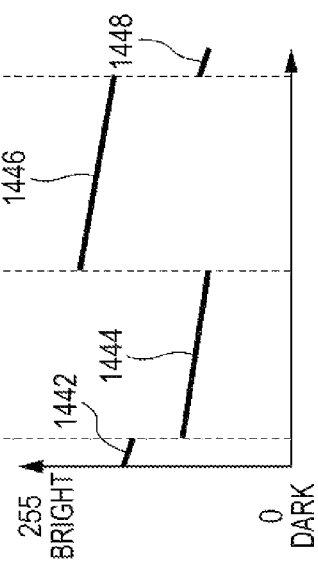

In FIG. 14A, a subject document 1410 to be photographed is a name card and contains, not only a black and white portion, but also a chromatic color portion (e.g., a certain region may be a photograph or may be filled with a solid color different from the color of the paper of the document, i.e., a color other than white). More specifically, within the subject document 1410, the background of a region 1412 is red, the background of a region 1414 is white, and a graphic 1416 is a red mark. The subject document 1410 is photographed by using, for example, a digital camera, resulting in a photographed image 1430 shown in FIG. 14C. The photographed image 1430 shows that image deterioration, such as a fog image 1420 shown in FIG. 14B, has occurred and is superposed on the photographed image 1430. There are various reasons why the fog image 1420 is generated, such as non-uniformity of illumination, taking a picture facing toward the light, the position of the subject document 1410 (i.e., positional relationship among the subject document 1410, illumination, and an image capturing device), and the configuration of the lenses of a digital camera (e.g., the center portion of an image is brighter, while the peripheral portion thereof is darker). FIG. 14B shows that the fog image 1420 is a gradation image in which the top right is a dark black and the bottom left is white, i.e., the shade of the color progressively changes. Accordingly, in the photographed image 1430 shown in FIG. 14C, although the top right is a dark black, the bottom left is close to the image of the original subject document 1410. This fog is also referred to as "shadow" or "black fog".

Fog images may be generated, not only by the use of a digital camera, but also by the use of a scanner. For example, in a so-called flatbed scanner, a pivotable pressure plate is provided on contact glass, and after setting a document on the contact glass, the pressure plate is closed and the document is scanned. Documents to be scanned include not only sheet-like documents, but also book-like documents (books, booklets, etc.). Such a book-like document is also set on the contact glass and is scanned. However, the binding portion of such a document is elevated above the contact glass, and is separated from the focal plane. As a result, image deterioration called "fog" occurs in the resulting scanned image corresponding to a position at which the binding portion of the document has been set.

A description will now be given of an exemplary embodiment of the invention with reference to the accompanying drawings.

Figure 1:
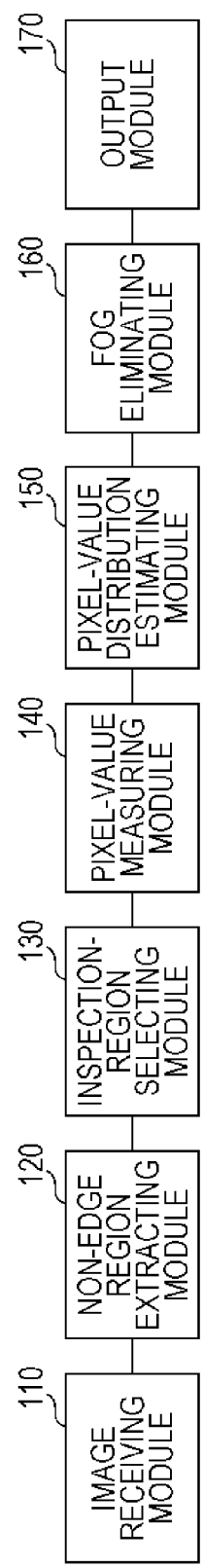
FIG. 1 is a block diagram illustrating conceptual modules forming an image processing apparatus according to an exemplary embodiment.

FIG. 1 is a block diagram illustrating conceptual modules forming an image processing apparatus according to an exemplary embodiment.

Generally, modules are software (computer programs) components or hardware components that can be logically separated from one another. Accordingly, the modules of this exemplary embodiment are not only modules of a computer program, but also modules of a hardware configuration. Accordingly, this exemplary embodiment will also be described in the form of a computer program for allowing a computer to function as those modules (a program for causing a computer to execute program steps, a program for allowing a computer to function as corresponding units, a computer program for allowing a computer to implement corresponding functions), a system, and a method. While expressions such as "store", "storing", "being stored", and equivalents thereof are used for the sake of description, such expressions indicate, when this exemplary embodiment relates to a computer program, storing the computer program in a storage device or performing control so that the computer program is stored in a storage device. Modules may correspond to functions based on a one-on-one relationship. In terms of implementation, however, one module may be constituted of one program, or plural modules may be constituted of one program. Conversely, one module may be constituted of plural programs. Additionally, plural modules may be executed by using a single computer, or one module may be executed by using plural computers in a distributed or parallel environment. One module may integrate another module therein. Hereinafter, the term "connection" includes, not only physical connection, but also logical connection (sending and receiving of data, giving instructions, reference relationship among data elements, etc.). The term "predetermined" means being determined before a certain operation, and includes the meaning of being determined prior to a certain operation before starting processing of this exemplary embodiment, and also includes the meaning of being determined prior to a certain operation even after starting processing of this exemplary embodiment, in accordance with the current situation/state or in accordance with the previous situation/state.

A system or an apparatus may be realized by connecting plural computers, hardware units, devices, etc., one another via a communication medium, such as a network (including communication based on a one-on-one correspondence), or may be realized by a single computer, hardware unit, device, etc. The terms "apparatus" and "system" are used synonymously. The term "system" does not include merely a man-made social "mechanism" (social system).

Additionally, before performing an operation by using a corresponding module or when performing plural operations by using a corresponding module, target information is read from a storage device, and after performing the operation, a processed result is written into the storage device. Accordingly, a description of reading from the storage device before an operation or writing into the storage device after an operation may be omitted. Examples of the storage device may include a hard disk, a random access memory (RAM), an external storage medium, a storage device using a communication circuit, a register in a central processing unit (CPU), etc.

An image processing apparatus shown in FIG. 1 of this exemplary embodiment serves the function to eliminate fog from images. The image processing apparatus shown in FIG. 1 by way of example includes an image receiving module 110, a non-edge region extracting module 120, an inspection-region selecting module 130, a pixel-value measuring module 140, a pixel-value distribution estimating module 150, a fog eliminating module 160, and an output module 170.

The image receiving module 110 is connected to the non-edge region extracting module 120. The image receiving module 110 receives an image and delivers the received image to the non-edge region extracting module 120. Receiving an image includes reading an image by using, for example, a scanner and a camera, receiving an image from an external device by using, for example, a fax machine, via a communication circuit, reading an image stored in a hard disk (which may be built in a computer or may be connected to the computer via a network), etc. The image is a multi-valued (including a color image) image. Only one image may be received or plural images may be received. The contents of images include business documents (e.g., the above-described name cards), advertising pamphlets, images drawn on a whiteboard, etc. The image receiving module 110 may make correction for the received image by performing digital filer processing, etc., such correction including camera shake correction. An example of processing performed by the image receiving module 110 will be discussed later with reference to FIG. 3.

The non-edge region extracting module 120 is connected to the image receiving module 110 and the inspection-region selecting module 130. The non-edge region extracting module 120 extracts regions from an image received by the image receiving module 110 and delivers the extracted regions to the inspection-region selecting module 130.

The non-edge region extracting module 120 also extracts regions equal to or larger than a predetermined size or regions larger than the predetermined size, and if the non-edge region extracting module 120 has not found such regions, operations of the inspection-region selecting module 130, the pixel-value measuring module 140, the pixel-value distribution estimating module 150, the fog eliminating module 160, and the output module 170 may not be performed. In this case, the non-edge region extracting module 120 may output information indicating that the above-described regions have not been found (i.e., elimination of fog has not been performed).

The regions to be extracted are regions in which color values are changed smoothly and continuously, in other words, edgeless regions or regions surrounded by edges.

An example of the processing performed by the non-edge region extracting module 120 will be discussed later with reference to FIGS. 4 and 5.

The inspection-region selecting module 130 is connected to the non-edge region extracting module 120 and the pixel-value measuring module 140. The inspection-region selecting module 130 selects a region from the regions extracted by the non-edge region extracting module 120 in accordance with a predetermined rule, and delivers the selected region to the pixel-value measuring module 140.

The predetermined rule employed in the inspection-region selecting module 130 may be determined by using the sizes of the regions or the luminance or chroma values of the regions extracted by the non-edge region extracting module 120. Alternatively, the predetermined rule may be determined by at least one of the variance of the chroma values of the pixels in the extracted regions, the positions of the regions in the image, and the sizes of the outer peripheries of the regions.

An example of the processing performed by the inspection-region selecting module 130 will be discussed later with reference to FIG. 6.

The pixel-value measuring module 140 is connected to the inspection-region selecting module 130 and the pixel-value distribution estimating module 150. The pixel-value measuring module 140 measures the luminance values of the pixels in the region selected by the inspection-region selecting module 130, and delivers the measurement result to the pixel-value distribution estimating module 150. The luminance values of the pixels are measured by scanning the region in a predetermined direction.

The scanning direction in which the region is scanned for measuring the luminance values of the pixels may be at least one of a horizontal direction, a vertical direction, an oblique direction, a direction in which the region is scanned in an elliptical shape. The scanning direction may be two directions, such as a combination of the horizontal direction and the vertical direction, a top right oblique direction and a bottom right oblique direction, or may be one direction, such as scanning the region in an elliptical shape, or may be a combination of three scanning directions.

An example of the processing performed by the pixel-value measuring module 140 will be discussed later with reference to FIGS. 7A through 8B.

The pixel-value distribution estimating module 150 is connected to the pixel-value measuring module 140 and the fog eliminating module 160. The pixel-value distribution estimating module 150 estimates a function representing the degree of fog in the image received by the image receiving module 110 from the pixel values measured by the pixel-value measuring module 140, and delivers the estimated function to the fog eliminating module 160. The function representing the degree of fog may be a linear function or a multidimensional function, such as a quadratic function.

The pixel-value distribution estimating module 150 may estimate a function generated by connecting the luminance values of the pixels in the region selected by the inspection-region selecting module 130.

An example of the processing performed by the pixel-value distribution estimating module 150 will be discussed later with reference to FIGS. 9A through 10C.

The fog eliminating module 160 is connected to the pixel-value distribution estimating module 150 and the output module 170. The fog eliminating module 160 eliminates fog from the image received by the image receiving module 110 on the basis of the function estimated by the pixel-value distribution estimating module 150, and delivers the image from which fog has been eliminated to the output module 170.

If the pixel-value measuring module 140 has measured the luminance values of the pixels by scanning the region of the image in plural scanning directions, the fog eliminating module 160 may calculate the value of fog at a position in which the scanning directions intersect with each other, on the basis of the values obtained from plural functions estimated by the pixel-value distribution estimating module 150. Concerning pixels which are not positioned on the scanning lines, the values of fog at the positions of such pixels may be calculated by using the values of fog at the positions of the pixels on the scanning lines in accordance with the distances between the pixels on the scanning lines and the corresponding pixels which are not on the scanning lines. The values of fog indicate the differences between the pixel values of the received image and the pixel values of the original image (pixel values of an image which has been photographed without the occurrence of fog).

An example of the processing performed by the fog eliminating module 160 will be discussed later with reference to FIGS. 11 through 13.

The output module 170 is connected to the fog eliminating module 160. The output module 170 receives the image from which fog has been eliminated by the fog eliminating module 160 and outputs the image. Outputting an image includes printing an image by using, for example, a printer, displaying an image on, for example, a display, transmitting an image by using an image transmitting apparatus, such as a fax machine, writing an image into an image storage device, such as an image database, storing an image in a storage medium, such as a memory card, delivering an image to another information processing apparatus, etc. Such an image may be output in association with the image received by the image receiving module 110.

Figure 2:
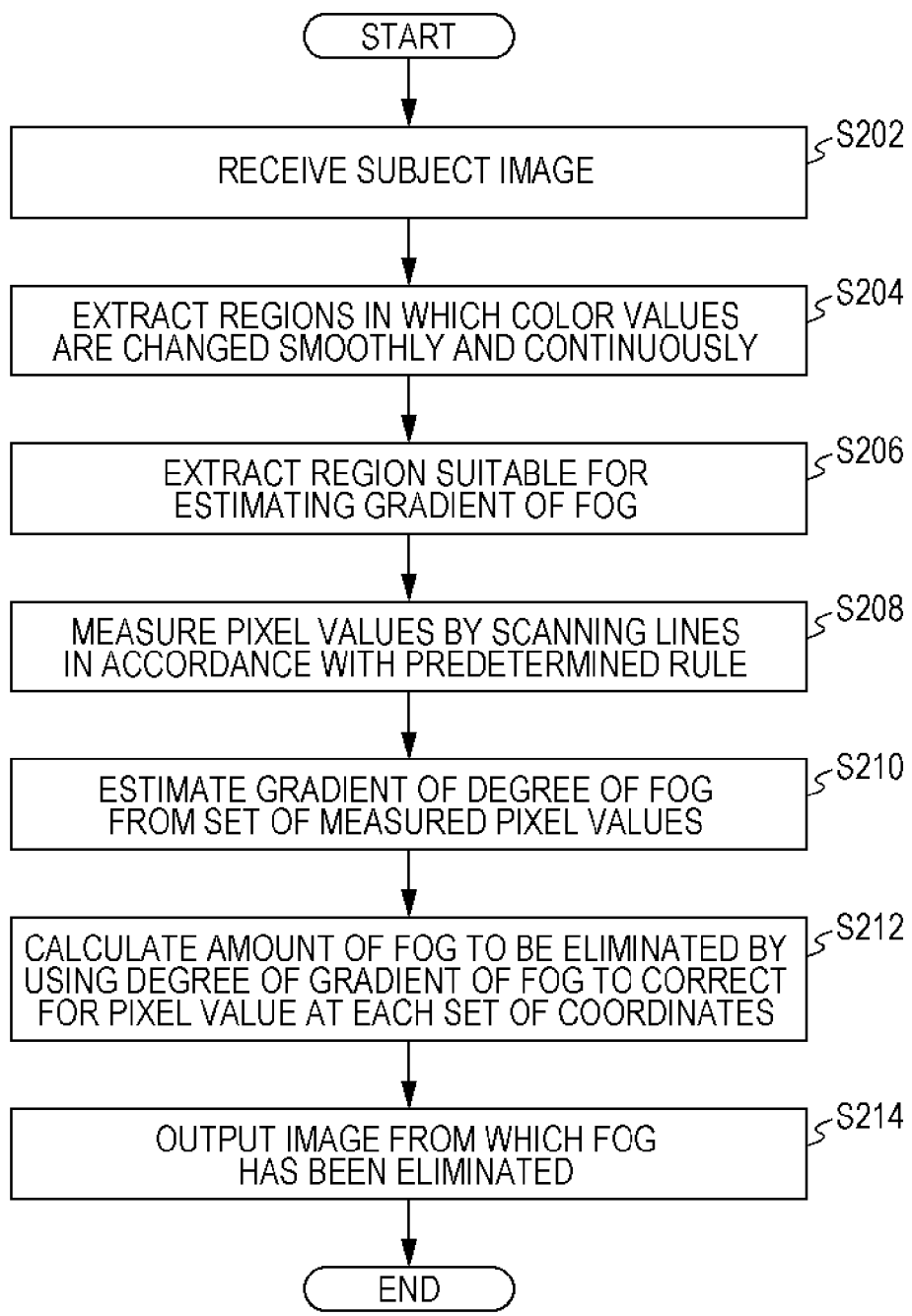
FIG. 2 is a flowchart illustrating an example of processing performed by the exemplary embodiment.

FIG. 2 is a flowchart illustrating an example of the processing performed by this exemplary embodiment.

In step S202, the image receiving module 110 receives a subject image.

Figure 3:
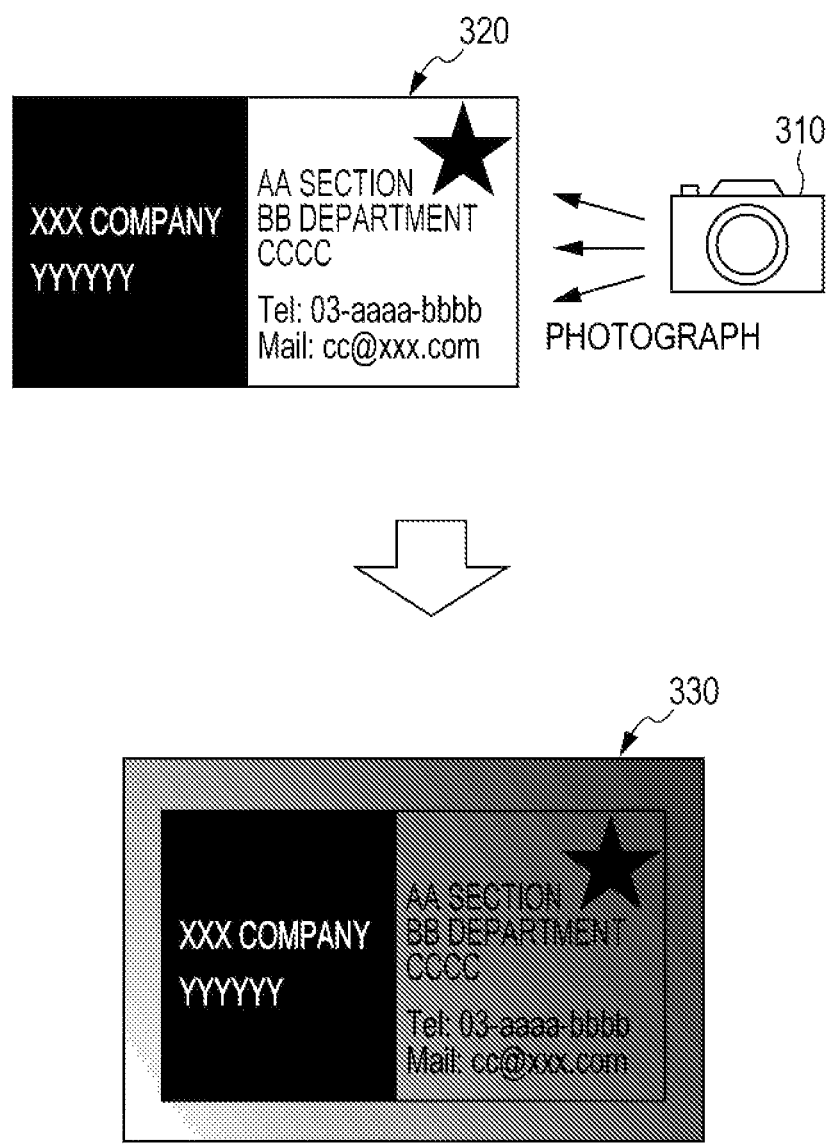
FIG. 3 illustrates an example of processing performed by an image receiving module.

FIG. 3 illustrates an example of the processing performed by the image receiving module 110. A subject document 320 to be photographed is equivalent to the subject document 1410 shown in FIG. 14A. The subject document 320 includes a region having a red background at the left side, a region having a white background at the right side, and a region representing a red mark at the top right. When the subject document 320 is photographed by using an image capturing device 310, fog occurs and is reflected in a resulting image, such as that in a photographed image 330. For example, after exchanging name cards, the subject document 320 representing one of the name cards is placed on a desk and is photographed with the image capturing device 310. The image capturing device 310 may be an independent digital camera, a digital camera built in a personal digital assistant e.g., in a cellular phone including a smartphone, or a scanner, etc.

In step S204, the non-edge region extracting module 120 extracts regions in which color values are changed smoothly and continuously.

Figure 4:
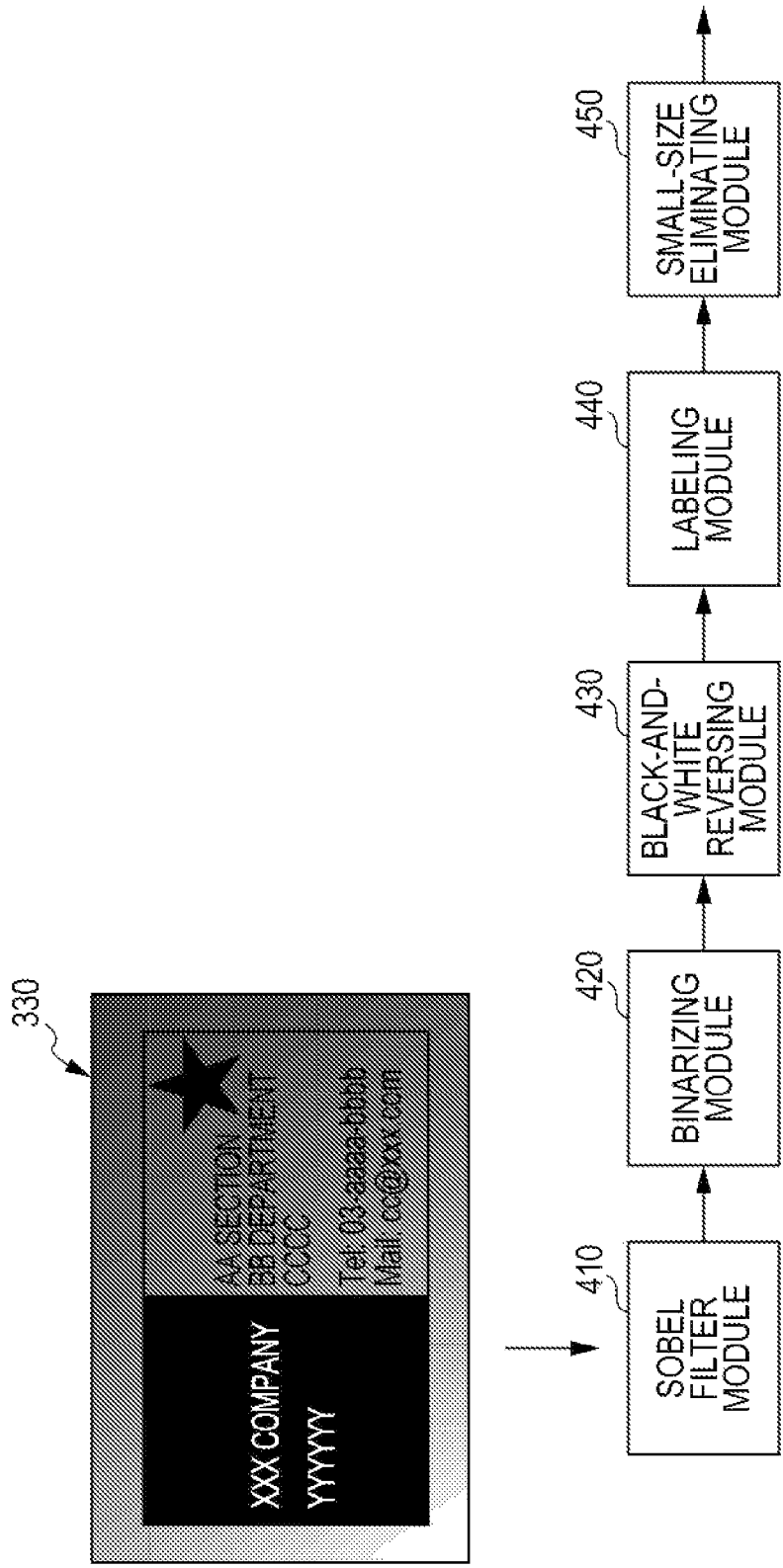
FIGS. 4 and 5 illustrate an example of processing performed by a non-edge region extracting module.
Figure 5:
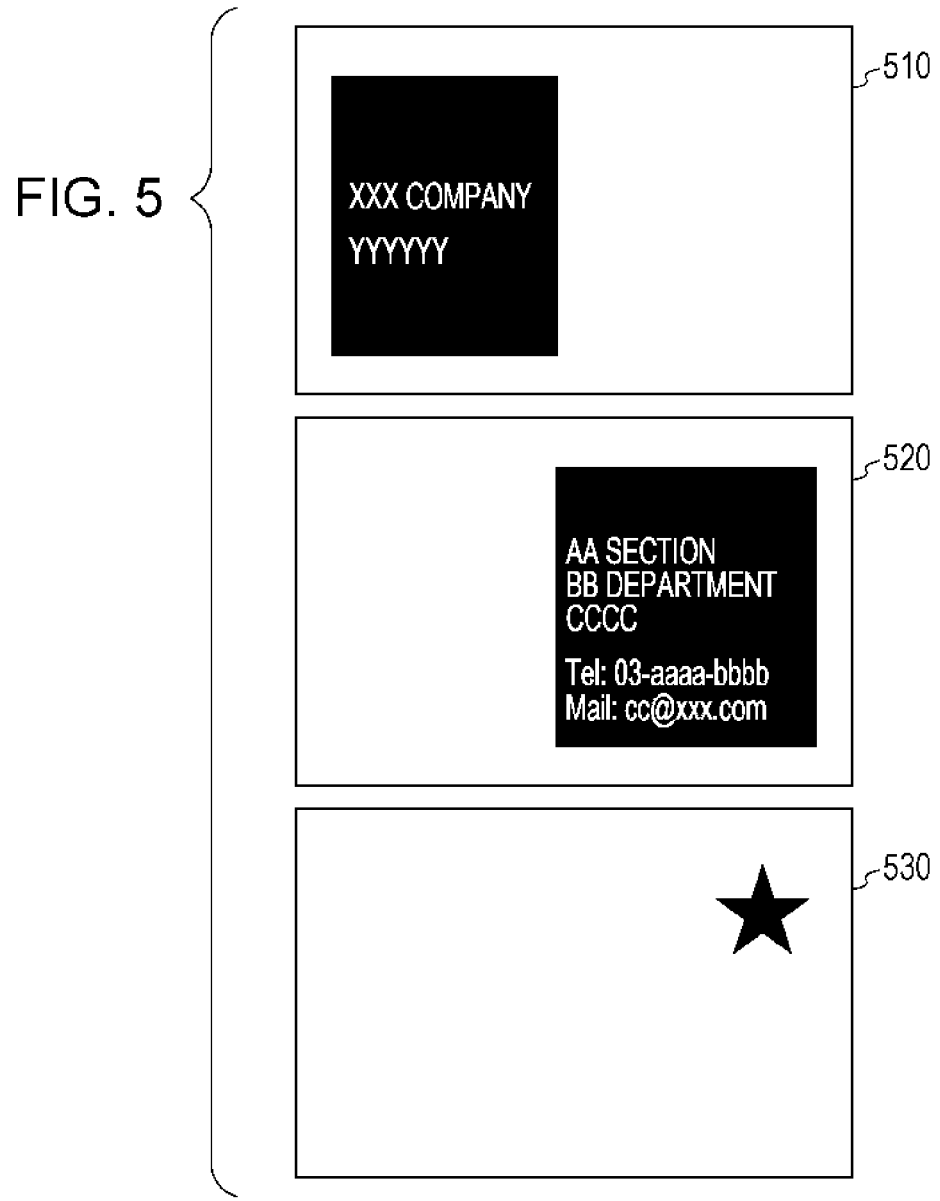

FIGS. 4 and 5 illustrate an example of processing performed by the non-edge region extracting module 120. The non-edge region extracting module 120 includes, for example, a sobel filter module 410, a binarizing module 420, a black-and-white reversing module 430, a labeling module 440, and a small-size eliminating module 450.

The sobel filter module 410 is connected to the binarizing module 420, and performs sobel filter processing on the photographed image 330 received in step S202 and delivers the resulting image to the binarizing module 420. The sobel filter processing is to detect edges of vertical lines or horizontal lines by using a filter. In the sobel filter processing, lines other than vertical lines and horizontal lines may be detected depending on the design of the filter.

The binarizing module 420 is connected to the sobel filter module 410 and the black-and-white reversing module 430. Upon receiving an image in which edges have been detected by the sobel filter module 410, the binarizing module 420 performs binarizing processing on the image and delivers the binarized image to the black-and-white reversing module 430. As this binarizing processing, a known binarizing processing technique may be applied. As a result of this binarizing processing, the edges have turned out to be black and the other portions have turned out to be white.

The black-and-white reversing module 430 is connected to the binarizing module 420 and the labeling module 440. Upon receiving the binarized image from the binarizing module 420, the black-and-white reversing module 430 performs black-and-white reverse processing on the binarized image and delivers the resulting image to the labeling module 440. As a result of this black-and-white reverse processing, the edges are changed to white, and the other portions are changed to black.

The labeling module 440 is connected to the black-and-white reversing module 430 and the small-size eliminating module 450. Upon receiving an image subjected to black and white reverse processing by the black-and-white reversing module 430, the labeling module 440 performs labeling processing on the image and delivers the resulting image to the small-size eliminating module 450. As a result of this labeling processing, the same label is attached to a black region exhibiting continuous black pixels. Accordingly, by extracting the regions attached with the same label, regions without an edge can be extracted.

The small-size eliminating module 450 is connected to the labeling module 440. Upon receiving an image labeled by the labeling module 440, the small-size eliminating module 450 eliminates noise, which corresponds to regions equal to or smaller than a predetermined size or regions smaller than the predetermined size. In other words, as a result of this processing, regions equal to or greater than the predetermined size or regions greater than the predetermined size can be extracted. The area of a region attached with the same label may be determined by counting the number of pixels attached with the same label or by calculating the area of a circumscribed rectangle of that region.

An example of the image obtained by performing the above-described processing on the photographed image 330 shown in FIG. 4 is shown in FIG. 5. A region image 510 is a region having a red background at the left side of the photographed image 330. A region image 520 is a region having a white background at the right side of the photographed image 330. A region image 530 is a region having a red mark at the top right of the photographed image 330. However, those images are binary images, and serve as mask images. More specifically, a logical AND operation between the photographed image 330 and the mask images is performed, thereby making it possible to extract the regions corresponding to the mask images from the photographed image 330.

The non-edge region extracting module 120 may extract non-edge regions by performing processing other than the processing using the module configuration shown in FIG. 4. For example, the non-edge region extracting module 120 may extract non-edge regions by integrating the same color pixels. The same color pixels are not restricted to exactly the same color pixels, but may be color pixels having a predetermined relationship. More specifically, a certain pixel may be selected from an image, and pixels which are in contact with the selected pixel and which have a predetermined relationship with the selected pixel (e.g., the distance between the two pixels is equal to or smaller than a predetermined value or the distance between the two pixels is smaller than the predetermined value in a color space) may be integrated. Then, the above-described integration processing may be similarly performed on the integrated pixel. As a result, a non-edge region is extracted.

Referring back to the flowchart of FIG. 2, in step S206, the inspection-region selecting module 130 extracts a region suitable for estimating the gradient of the luminance values of fog.

The inspection-region selecting module 130 extracts the characteristic values of the regions extracted in step S204. Then, the inspection-region selecting module 130 calculates the value according to equation (1) (discriminant function) for each region, and selects a region (in this example, the above-described mask image) in accordance with the calculated values. For example, among the regions extracted in step S204, the region having the maximum value is selected.

$$f(X_i; w) = \sum_j w_j x_{ij} \quad (1)$$

In equation (1), $w_j$ in the right side is a weight, and may be a positive number, 0, or a negative number. If $w_j$ is 0, it means that the corresponding characteristic value (weight) is not used. If $w_j$ is a negative number, the characteristic value acts in the negative direction. The weight $w_j$ is a predetermined value which may be set by an operator or which may be a value obtained by conducting learning by using supervisor data in which a correct answer is determined among several choices.

In equation (1), $x_{ij}$ in the right side denotes characteristic values. The inspection-region selecting module 130 extracts those characteristic values from each region (i). The characteristic values $x_{ij}$ include:

$x_{i0}$ is the width or the height of a region, or may be a width×height (i.e., the area of a circumscribed rectangle);

$x_{i1}$ is the area of a region;

$x_{i2}$ is the pixel density of a region;

$x_{i3}$ is the average of the luminance values (e.g., the value of L* in the case of an L*ab color space) of the pixels within a region;

$x_{i4}$ is the average of the chroma values (e.g., the values of a and b in the case of an L*ab color space) of the pixels within a region;

$x_{i5}$ is the variance of the chroma values of the pixels within a region;

$x_{i6}$ is the distance from the center of gravity of a region (mask image) to the center of the image received in step S202; and $x_{i7}$ is the length of the peripheral contour of a region/the boundary length of a circumscribed rectangle of the region.

The above-described characteristic values are merely examples, and other characteristic values may be used. Additionally, as one of the characteristic values, the average of the luminance or chroma values is used for describing the typical luminance or chroma of the pixels in a region. However, instead of using the average, a value representing the typical luminance or chroma of a region may be used, for example, a modal value or a median value may be used.

It is not necessary to use all the characteristic values, and some of them may be selected. For example, a discriminant function using one of the characteristic values $x_{i0}$, $x_{i1}$, and $x_{i2}$ may be employed. This is because a large area is suitable for estimating a function representing the degree of fog.

Further, $x_{i3}$ or $x_{i4}$ may be added in order to select a background region of the document. This is because a background region is also suitable for estimating a function indicating the degree of fog. The background region is generally white, and thus, it has a high luminance value and a low chroma value. The weight $w_4$ of the chroma value $x_{i4}$ is a negative value.

The above-described characteristic values are sufficient to estimate the degree of fog superposed on images, such as name cards, documents, and whiteboards having a white background. However, such characteristic values may not be sufficient for images obtained by photographing a document, such as a name card, in which a landscape picture occupies the half of the area of the document (the area of the white background is relatively narrow), or for images obtained by photographing a whiteboard facing toward the light (the surrounding portion of the photographed image has a high luminance value).

Accordingly, $x_{i5}$ through $x_{i7}$ may be added.

Generally, the variance of chroma values of a landscape picture is higher than that of a background. Thus, $x_{i5}$ may be used so that a region having a smaller variance of chroma values can be selected while preventing a landscape picture from being selected. The weight $w_5$ of the variance of the chroma values $x_{i5}$ is a negative value.

Generally, when photographing an image, a user intentionally places a target region at the center of the image. Accordingly, $x_{i6}$ may be used so that a region of which the center of gravity (or the center) is placed around the center of the image can be selected. The weight $w_6$ of the distance $x_{i6}$ is a negative value.

The outer periphery of a region of a landscape picture contains more uneven portions than that of a circumscribed rectangle. In contrast, the background of, for example, a name card, is a rectangle, and, in most cases, the outer periphery of the rectangle is linear. Accordingly, $x_{i7}$ may be used so that a region having a short peripheral contour can be selected while preventing a landscape picture from being selected. The weight $w_7$ of the peripheral contour $x_{i7}$ is a negative value.

FIG. 6 illustrates an example of the processing performed by the inspection-region selecting module 130. The calculation result of the discriminant function for the region image 510 is 1.5, as expressed by equation (2).

$$f(X_1; w) = \sum_{j=1.5} w_j x_{1j} \quad (2)$$

The calculation result of the discriminant function for the region image 520 is 2.0, as expressed by equation (3).

$$f(X_2; w) = \sum_{j=2.0} w_j x_{2j} \quad (3)$$

The calculation result of the discriminant function for the region image 530 is 0.2, as expressed by equation (4).

$$f(X_3; w) = \sum_{j=0.2} w_j x_{3j} \quad (4)$$

Then, the maximum of the calculated values of the discriminant functions, as expressed by equation (5), is selected.

$$X^* = \underset{i}{\mathrm{argmax}} f(X_i; w) \quad (5)$$

In this case, the region corresponding to the region image 520 is selected, as expressed by equation (6).

$$X^* = X_2 \quad (6)$$

In step S208, the pixel-value measuring module 140 scans the lines of the region in accordance with a predetermined rule so as to measure the pixel values in the region.

FIGS. 7A through 8B illustrate an example of the processing performed by the pixel-value measuring module 140.

An extracted region image 700 is an image obtained by performing a logical AND operation between the image 330 received in step S202 and the region image 520 selected in step S206. That is, the region having a white background at the right side of the photographed image 330 is extracted. Scanning is performed on the extracted region image 700 in the vertical and horizontal directions at predetermined intervals (e.g., at equal intervals). For example, lines 702 through 718 are scanned in the horizontal direction and lines 722 through 742 are scanned in the vertical direction. Then, a graph is plotted by connecting the luminance values of the pixels. An example of a graph representing the luminance values of pixels obtained by scanning the line 702 is shown in FIG. 7B. Since the line 702 is not contained in the selected region, the graph is constituted of only invalid data. An example of the graph obtained by scanning the line 712 is shown in FIG. 7C. Since part of the line 702 is contained in the selected region, the graph is constituted of valid data and invalid data. In the graph shown in FIG. 7C, the luminance value decreases toward the right side. This is because the fog image becomes darker, on the whole, toward the upper right side.

A determination regarding whether the graph contains valid data or invalid data can be made by scanning the region image (mask image, i.e., the region image 520 shown in FIG. 6) selected by the inspection-region selecting module 130. Positions within the black portion in the region image 520 correspond to positions containing valid data in the extracted region image 700, while positions within the white portion in the region image 520 correspond to positions containing invalid data in the extracted region image 700. In the graphs of this example, the luminance value of the invalid data is 0.

Figure 7A:
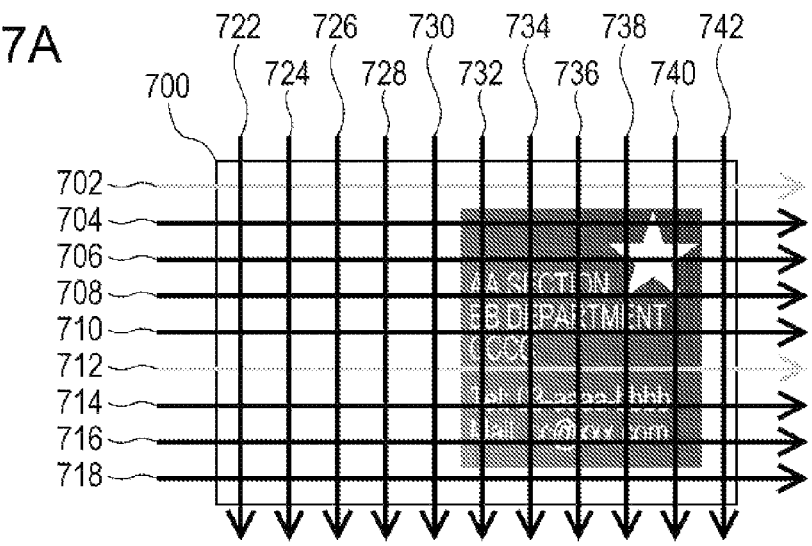
FIGS. 7A through 8B illustrate an example of processing performed by a pixel-value measuring module.
Figure 7B:
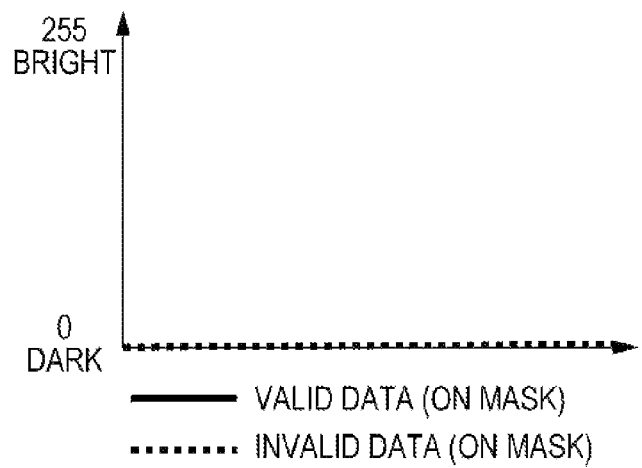
Figure 7C:
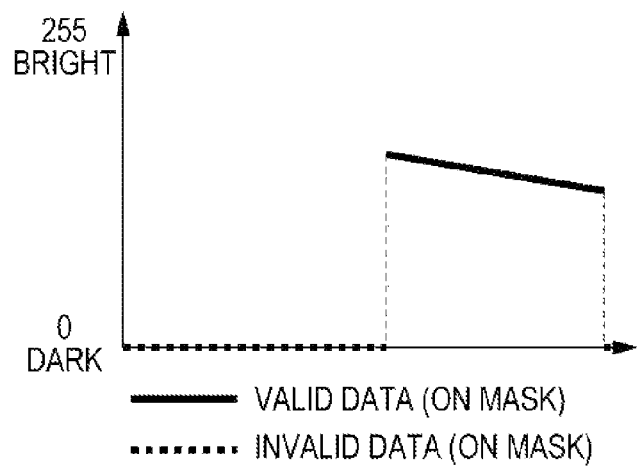
Figure 8A:
Figure 8B:

As the predetermined rule employed when scanning the extracted region image 700, not only the vertical and horizontal scanning shown in FIG. 7A, but also scanning shown in FIG. 8A may be performed. More specifically, in the scanning shown in FIG. 8A, scanning may be performed at predetermined intervals in an oblique direction from the top left side to the bottom right side and an oblique direction from the top right side to the bottom left side. Alternatively, scanning may be performed, as shown in FIG. 8B, in an elliptical shape at predetermined intervals. In this case, examples of the elliptical shape may include a circle. The scanning direction may be selected by an operator in accordance with the gradient of the luminance values of fog, or may be determined in advance in accordance with an image capturing device.

In step S210, the pixel-value distribution estimating module 150 estimates the gradient of degree of fog (function representing the degree of fog) from a set of the measured pixel values. As the function representing the degree of fog estimated in this example, a linear function is used by way of example.

FIGS. 9A through 10C illustrate an example of the processing performed by the pixel-value distribution estimating module 150.

As shown in the example of FIG. 9A, the function representing the degree of fog in the vertical scanning is represented by equation (7), and the function representing the degree of fog in the horizontal direction is represented by equation (8).

$$c_j(y; y_j, \delta_j) = \gamma_j + \delta_j x \quad (7)$$

$$r_j(x; \alpha_i, \beta_i) = \alpha_i + \beta_i x \quad (8)$$

In the example shown in FIG. 9B, lines including valid data are indicated by the solid lines, while lines including only invalid data are indicated by the dotted lines. The lines including valid data are the lines 704 through 716 and the lines 732 through 740. The lines including only invalid data are the lines 702 and 718 and the lines 722 through 730 and 742.

Figure 10C:
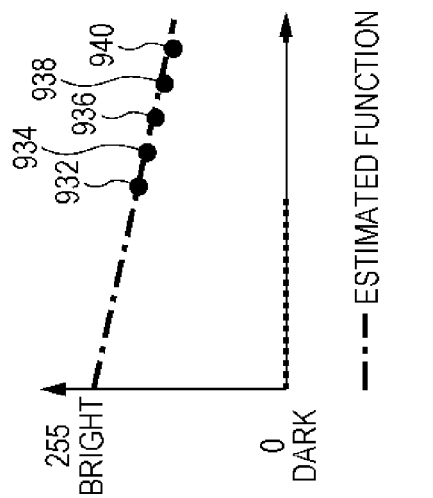
Figure 10B:
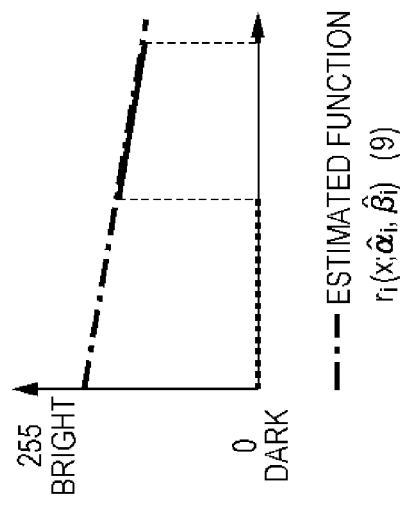
Figure 10A:
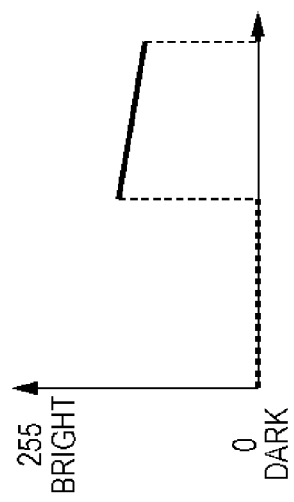

FIG. 10A illustrates a graph representing a line including valid data. Each of the lines 704 through 716 can be represented by a graph similar to the graph shown in FIG. 10A. A function represented by each of the graphs of the luminance values is estimated by using the least squares method, etc. For example, the function represented by a graph of the luminance values obtained by scanning the horizontal lines can be expressed by equation (9). In each of the lines, if the number of valid data elements is smaller than a predetermined number, the function is estimated without using those valid data elements. In the example shown in FIG. 10B, equation (9) is represented by the one-dot chain line.

$$r_i(x; \hat{\alpha}_i, \hat{\beta}_i) \quad (9)$$

The function is applicable to the lines without valid data. Accordingly, in order to determine luminance values at estimation points 932 through 940 on the line 702 without valid data, as shown in FIG. 9C, the function is applied, as shown in FIG. 10C, to determine the luminance values at the estimation points 932 through 940. This means that the estimated function applies to the entire image.

Estimation of the function using vertical lines is performed similarly to estimation of the function using horizontal lines.

In step S212, the fog eliminating module 160 calculates the amount of fog to be eliminated by using the gradient of degree of fog (function estimated in step S210), thereby correcting the pixel value of the image at each set of coordinates of the graph. As a result of the correction performed in step S212, fog is eliminated from the photographed image so as to reconstruct the original image.

Figure 11:
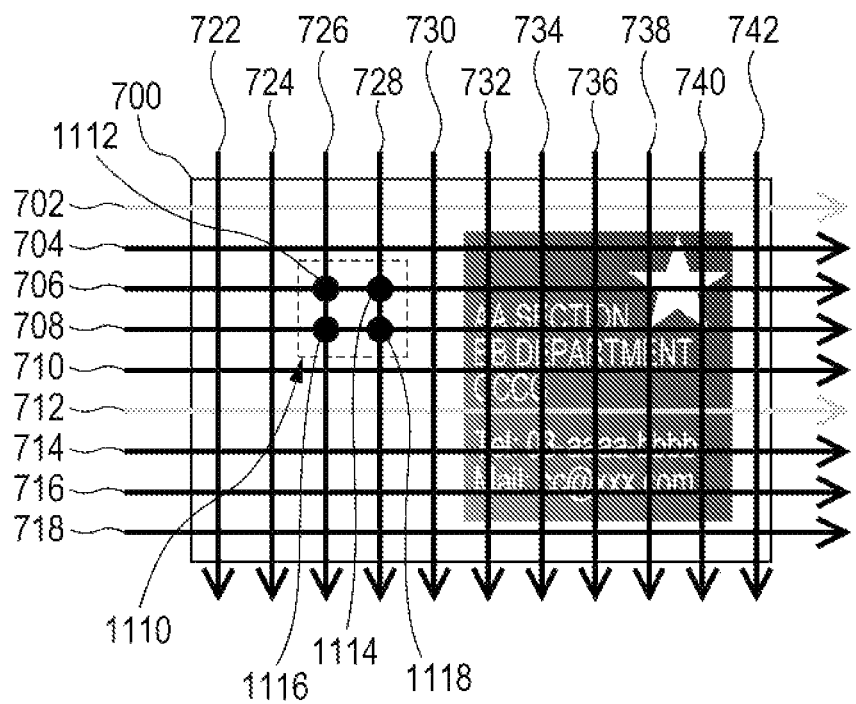
FIGS. 11 through 13 illustrate an example of processing performed by a fog eliminating module.
Figure 12:
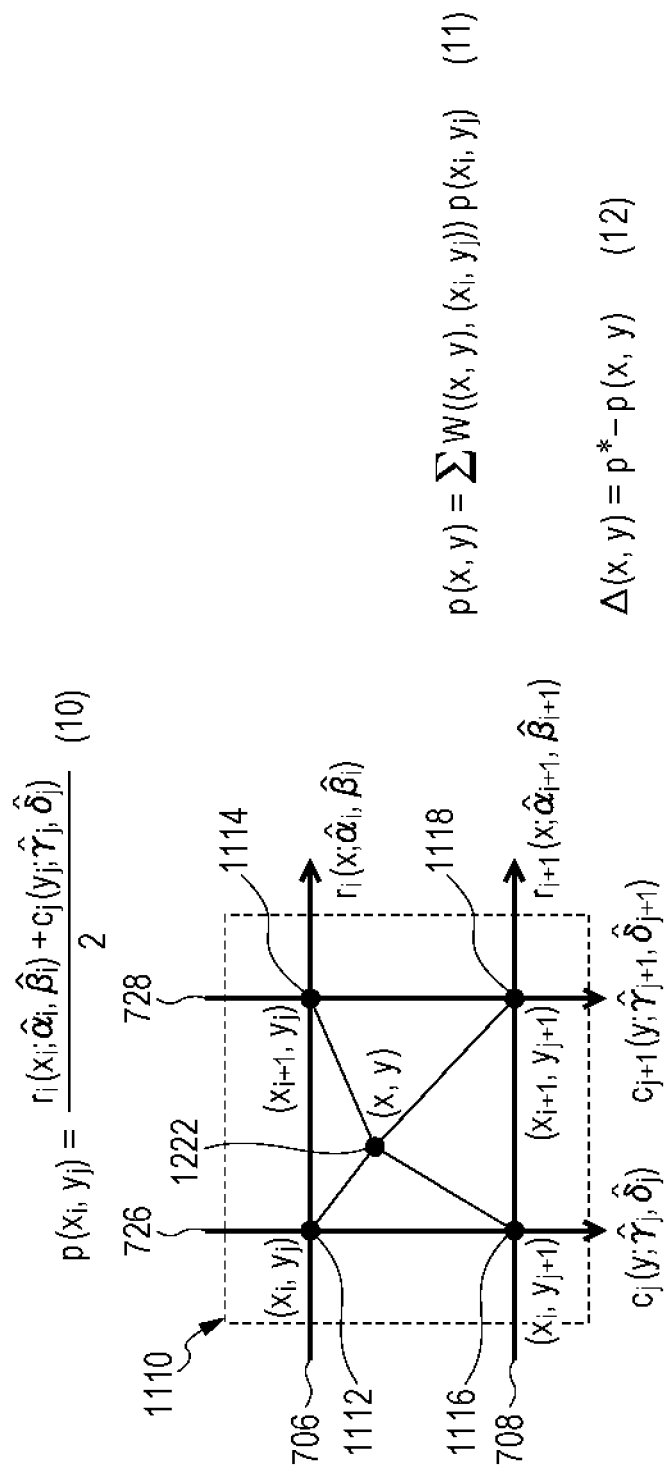
Figure 13:
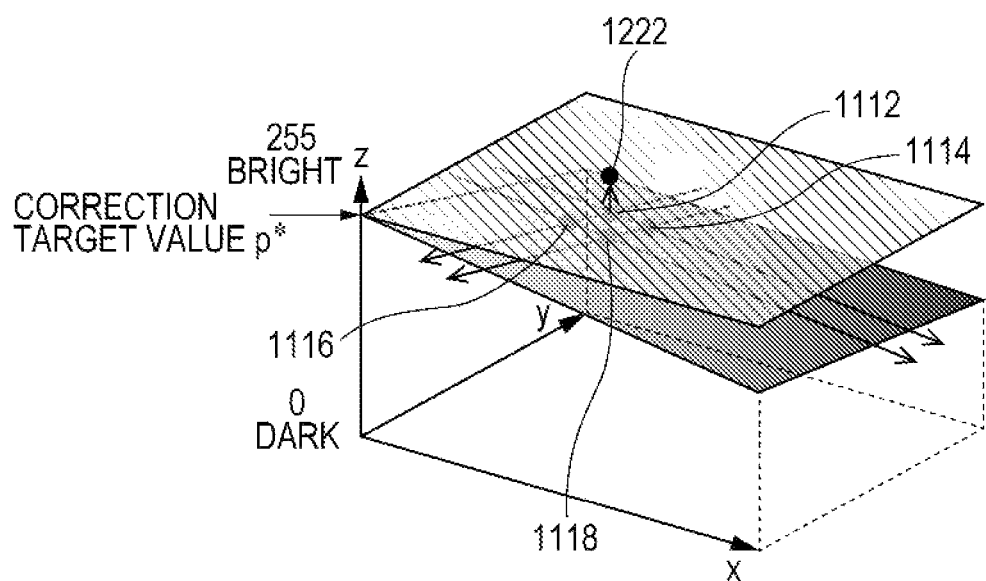

FIGS. 11 through 13 illustrate an example of the processing performed by the fog eliminating module 160.

Calculation of the amounts of fog at four points of intersection 1112, 1114, 1116, and 1118 within a region 1110 shown in FIG. 11 will be described below with reference to FIG. 12. The point of intersection 1112 is the intersection between the lines 706 and 726. The point of intersection 1114 is the intersection between the lines 706 and 728. The point of intersection 1116 is the intersection between the lines 708 and 726. The point of intersection 1118 is the intersection between the lines 708 and 728. Those points of intersection 1112 through 1118 are contained in a region without valid data.

The luminance value at the point of intersection 1112 is calculated by using equation (10).

$$p(x_i, y_j) = \frac{r_i(x_i; \hat{\alpha}_i, \hat{\beta}_i) + c_j(y_j; \hat{\gamma}_j, \hat{\delta}_j)}{2} \quad (10)$$

The luminance value calculated by using equation (10) is the average of the function $r_i$ of the line 706 and the function $c_j$ of the line 726 at the point of intersection 1112 ($x_i$, $y_j$). Similarly, the luminance value at the point of intersection 1114 is the average of the function $r_i$ of the line 706 and the function $c_{i+1}$ of the line 728 at the point of intersection 1114 ($x_{i+1}$, $y_j$). The luminance value at the point of intersection 1116 is the average of the function $r_{i+1}$ of the line 708 and the function $c_j$ of the line 726 at the point of intersection 1116 ($x_i$, $y_{j+1}$). The luminance value at the point of intersection 1118 is the average of the function $r_{i+1}$ of the line 708 and the function $c_{j+1}$ of the line 728 at the point of intersection 1118 ($x_{i+1}$, $y_{j+1}$). In this manner, the pixel value of a pixel at a point of intersection is set as the average value of the function of the corresponding horizontal line and the function of the corresponding vertical line.

Then, the luminance value of a pixel which is not positioned at a point of intersection, e.g., the luminance value of a pixel positioned at an intermediate point 1222 shown in FIG. 12, is calculated by using equation (11).

$$p(x,y) = \Sigma W((x,y),(x_i,y_j))p(x_i,y_j) \quad (11)$$

In equation (11), the luminance value of the pixel at the intermediate point 1222 is calculated by using the luminance values of the pixels at the four points of intersection surrounding the intermediate point 1222. Accordingly, calculating the luminance value of a pixel which is not positioned at a point of intersection is performed after calculating the luminance values of the pixels at the surrounding points of intersection.

In equation (11), the position of the intermediate point 1222 is represented by (x, y). W((x, y), ($x_i$, $y_j$)) on the right side is the distance weight. That is, W((x, y), ($x_i$, $y_j$)) is a weight that uses the distance from the intermediate point 1222 to each of the four points of intersection 1112, 1114, 1116, and 1118. The total of the weights of the four points of intersection is one, and the weight is the reciprocal of the distance. Accordingly, if the distances from the intermediate point 1222 to the four points of intersection 1112 through 1118 are equal to each other, the luminance value at the intermediate point 1222 is obtained by adding together ¼ of the luminance values at the points of intersection 1112 through 1118.

Then, the amount of fog is calculated by using equation (12):

$$\Delta(x,y) = p^* - p(x,y) \quad (12)$$

where p* is the luminance value, which serves as a predetermined correction target value, and may be determined as follows. The luminance values at plural points of intersection (may be all the points of intersection in an image or may be the points of intersection in a region selected by the inspection-region selecting module 130) are collected so as to generate a luminance histogram. Then, in the luminance histogram, the luminance value at a predetermined points of intersection (e.g., a point of intersection having a luminance value lower than the brightest luminance by 10%) may be set as p*. Alternatively, an operator may set a certain luminance value for p*.

FIG. 13 illustrates a process of eliminating fog from an image, which is represented three-dimensionally. In FIG. 13, the x axis and the y axis designate a position in the image, and the z axis is a space representing the luminance value. Along the z axis, the gray plane positioned at the lower side is a fog image, which covers the entire image. The pale hatched plane positioned at the upper side designates the corrected luminance value of the image. As shown in FIG. 13, p* is the bright luminance value determined from the luminance histogram. The luminance values at the individual points of intersection are increased to p*, thereby eliminating fog. FIG. 13 shows that the luminance at the intermediate point 1222 is being increased.

In step S214, the output module 170 outputs an image from which fog has been eliminated. For example, a printer prints the image from which fog has been eliminated.

Figure 14F:
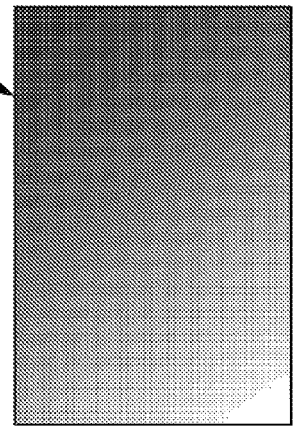

In comparison with this exemplary embodiment, a comparative example will be described below with reference to FIGS. 14C through 14F. Within the photographed image 1430 shown in FIG. 14C, a line 1432 is scanned, and the pixel values obtained as a result of the scanning are represented by a graph shown in FIG. 14D. That is, since the fog image 1420 is darker toward the right side, the luminance value decreases toward the right side accordingly. However, the luminance values of the original image are also reflected in the pixel values shown in FIG. 14D, and thus, the luminance values are progressively changed, as indicated by luminance distributions 1442, 1444, 1446, and 1448. Then, if the luminance values are corrected toward the target value, as shown in FIG. 14F, the resulting image is seen as a corrected image 1440 shown in FIG. 14E. In the corrected image 1440, in a portion without a white background, such as in the region 1412, the luminance becomes too bright so that the original red color has been removed. The reason for this phenomenon is as follows. The target for the correction processing in this comparative example is a paper document, which is entirely white. However, this correction processing is uniformly performed on a document containing a color portion and a white background, despite the fact that the luminance value of a chromatic color portion is lower than that of a white background.

In contrast, in this exemplary embodiment, the region 1414 is selected, and on the basis of the region 1414, the amount of fog is calculated, thereby correcting the luminance values of the image. As a result, the luminance of a portion without a white background, such as the region 1412, does not become too bright in contrast to the corrected image 1440 shown in FIG. 14E.

An example of the hardware configuration of the image processing apparatus according to this exemplary embodiment will be described below with reference to FIG. 15. The hardware configuration shown in FIG. 15 may be constituted of a personal computer (PC), and includes a data reading device 1517, such as a scanner, and a data output device 1518, such as a printer.

A CPU 1501 is a controller that executes processing in accordance with a computer program in which execution sequences of individual modules, such as the non-edge region extracting module 120, the inspection-region selecting module 130, the pixel-value measuring module 140, the pixel-value distribution estimating module 150, and the fog eliminating module 160, are described.

A read only memory (ROM) 1502 stores therein programs, computation parameters, etc. used by the CPU 1501. A RAM 1503 stores therein programs used by the execution of the CPU 1501 and parameters that are appropriately changed in the execution of the CPU 1501. The CPU 1501, the ROM 1502, and the RAM 1503 are connected to one another via a host bus 1504, such as a CPU bus.

The host bus 1504 is connected to an external bus 1506, such as a peripheral component interconnect (PCI)/interface bus, via a bridge 1505.

A keyboard 1508 and a pointing device 1509, such as a mouse, are input devices operated by an operator. A display 1510 includes a liquid crystal display (LCD) or a cathode ray tube (CRT), and displays various information as text or image information.

A hard disk drive (HDD) 1511 has a built-in hard disk and drives the hard disk to cause it to record or play back programs executed by the CPU 1501 or information. In the hard disk, received images, images of extracted regions, measured pixel values, estimated functions, etc. are stored. Additionally, various computer programs, such as various data processing programs, are also stored.

A drive 1512 reads data or a program recorded on a removable recording medium 1513, such as a magnetic disk, an optical disc, a magneto-optical disk, or a semiconductor memory, set in the drive 1512, and supplies the read data or program to the RAM 1503, which is connected to the drive 1512 via an interface 1507, the external bus 1506, the bridge 1505, and the host bus 1504. The removable recording medium 1513 is also usable as a data recording area, which is similar to a hard disk.

A connection port 1514 is a port for connecting an external connection device 1515 to the image processing apparatus, and includes a connecting section, such as a universal serial bus (USB) or IEEE-1394 port. The connection port 1514 is connected to the CPU 1501 via the interface 1507, the external bus 1506, the bridge 1505, and the host bus 1504. A communication device 1516 is connected to a network, and performs data communication processing with external devices. The data reading device 1517 is, for example, a scanner, and reads documents. The data output device 1518 is, for example, a printer, and outputs documents.

The hardware configuration shown in FIG. 15 is an example only, and any configuration may be employed for the image processing apparatus as long as it can execute the modules described in this exemplary embodiment. For example, some of the modules may be constituted of dedicated hardware, such as an application specific integrated circuit (ASIC), or may be contained in an external system and connected to the image processing apparatus via a communication circuit. Alternatively, two or more of the systems shown in FIG. 15 may be connected via a communication circuit and operated in cooperation with one another. The system may be integrated in a digital camera, a copying machine, a fax machine, a scanner, a printer, a multifunction device (an image processing apparatus including two or more functions of a scanner, a printer, a copying machine, a fax machine, etc.)

The above-described programs may be stored in a recording medium and be provided. The program recorded on a recording medium may be provided via a communication medium. In this case, the above-described program may be implemented as a "computer readable medium storing the program therein" in an exemplary embodiment of the invention.

The "computer readable medium storing a program therein" is a recording medium storing a program therein that can be read by a computer, and is used for installing, executing, and distributing the program.

Examples of the recording medium include digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered), a magneto-optical disk (MO), a flexible disk (FD), magnetic tape, a hard disk, a ROM, an electrically erasable programmable read only memory (EEPROM) (registered), a flash memory, a RAM, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination such networks. The program may be transmitted by using carrier waves.

The above-described program may be part of another program, or may be recorded, together with another program, on a recording medium. The program may be divided and recorded on plural recording media. Further, the program may be recorded in any form, e.g., it may be compressed or encrypted, as long as it can be reconstructed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising at least one processor which implements:
   a receiver that receives an image;
   an extractor that extracts, according to a determination of non-edge regions, regions from the image received by the receiver;
   a selector that selects, in accordance with a predetermined rule, a region from among the regions extracted by the extractor;
   a measurer that measures luminance values of pixels contained in the region selected by the selector;

an estimator that estimates, based on the luminance values of the pixels measured by the measurer, a function representing a degree of fog in the image received by the receiver; and an eliminator that eliminates, on the basis of the function estimated by the estimator, fog from the image received by the receiver, wherein the extractor extracts regions which are equal to or greater than a predetermined size or regions which are greater than the predetermined size, and in response to such regions not being found, processing using the selector, processing using the measurer, processing using the estimator, and processing using the eliminator are not performed.

2. The image processing apparatus according to claim 1, wherein the predetermined rule employed in the selector is employed based on a size of each of the regions extracted by the extractor.

3. The image processing apparatus according to claim 2, wherein the predetermined rule employed in the selector is employed based also on at least one of luminance values and chroma values of pixels contained in each of the regions extracted by the extractor.

4. The image processing apparatus according to claim 2, wherein the predetermined rule employed in the selector is employed based also on at least one of a variance of chroma values of pixels contained in each of the regions extracted by the extractor, a position of each of the regions in the image, and a size of an outer periphery of each of the regions.

5. The image processing apparatus according to claim 1, wherein the measurer measures the luminance values of the pixels by scanning the region selected by the selector in at least one of a horizontal direction, a vertical direction, an oblique direction, and a direction in an elliptical shape.

6. The image processing apparatus according to claim 1, wherein the estimator estimates the function based on a connecting of the luminance values of the pixels contained in the region selected by the selector.

7. The image processing apparatus according to claim 6, wherein, in response to the measurer scanning the region selected by the selector in a plurality of scanning directions in order to measure luminance values of pixels contained in the region selected by the selector, the eliminator calculates a value of fog at a position at which the plurality of scanning directions intersect with each other on the basis of a plurality of functions, which correspond to the plurality of scanning directions, estimated by the estimator.

8. An image processing method comprising:
receiving an image;
extracting, according to a determination of non-edge regions, regions from the received image;
selecting, in accordance with a predetermined rule, a region from among the extracted regions;
measuring luminance values of pixels contained in the selected region;
estimating, based on the measured luminance values of the pixels, a function representing a degree of fog in the received image; and
eliminating, on the basis of the estimated function, fog from the received image,
wherein the extracting comprises extracting regions which are equal to or greater than a predetermined size or regions which are greater than the predetermined size, and in response to such regions not being found, the selecting, the measuring, the estimating, and the eliminating are not performed.

9. A non-transitory computer readable medium storing a program causing a computer to execute a process, the process comprising:
receiving an image;
extracting, according to a determination of non-edge regions, regions from the received image;
selecting, in accordance with a predetermined rule, a region from among the extracted regions;
measuring luminance values of pixels contained in the selected region;
estimating, based on the measured luminance values of the pixels, a function representing a degree of fog in the received image; and
eliminating, on the basis of the estimated function, fog from the received image,
wherein the extracting comprises extracting regions which are equal to or greater than a predetermined size or regions which are greater than the predetermined size, and in response to such regions not being found, the selecting, the measuring, the estimating, and the eliminating are not performed.

10. The image processing apparatus according to claim 1, wherein the extractor detects edges of vertical lines or horizontal lines in the received image, performs a binarizing processing on the image to turn the detected edges to a first color and remaining portions to a second color, and performs labeling processing on the binarizing processed image so as to attach a same label to regions of continuous pixels of the second color.

11. The image processing apparatus according to claim 10, wherein the extractor eliminates noise from the labeling processed image by eliminating regions smaller than a predetermined size.

12. The image processing apparatus according to claim 1, wherein the selector determines, in accordance with the predetermined rule, a background region as the region from among the regions extracted by the extractor.

13. The image processing apparatus according to claim 1, wherein, in response to the measurer scanning the region selected by the selector in a plurality of scanning directions in order to measure luminance values of pixels contained in the region selected by the selector, the eliminator calculates a value of fog at a position of a first pixel which is not on any scanning line by using, in accordance with a distance between the first pixel and the second pixel, a value of fog at a position of a second pixel which is on a scanning line.

14. The image processing apparatus according to claim 1, wherein the eliminator eliminates, on the basis of the function estimated by the estimator, the fog by calculating a value of fog which corresponds to a difference between a pixel value of the received image and a corresponding pixel value of an original image.

15. An image processing apparatus comprising at least one processor which implements:
a storage that stores image information of image having a fog, a subject of the image having a chromatic color region;
an extractor that extracts, according to a determination of non-edge regions, regions from the image stored in the storage;
a selector that selects, in accordance with a predetermined rule, a region from among the regions extracted by the extractor;
a measurer that measures luminance values of pixels contained in the region selected by the selector, each pixel having coordinates in the image;

an estimator that estimates, based on the luminance value of the pixels measured by the measurer, a function representing a degree of fog for each of the coordinates of the pixels in the image stored in the storage; and an eliminator that eliminates, on the basis of the function estimated by the estimator, fog from the image stored in the storage, wherein the extractor extracts regions which are equal to or greater than a predetermined size or regions which are greater than the predetermined size, and in response to such regions not being found, processing using the selector, processing using the measurer, processing using the estimator, and processing using the eliminator are not performed.

* * * * *